US006404625B1

(12) United States Patent
Chen et al.

(10) Patent No.: US 6,404,625 B1
(45) Date of Patent: Jun. 11, 2002

(54) SUPPORTING MODULE FOR FORMING A FOLDABLE SUPPORTING STRUCTURE INSIDE A COMPUTER HOUSING

(75) Inventors: Eric A. Chen; Joe Cheng, both of Taipei (TW)

(73) Assignee: AOpen Inc. (TW)

( * ) Notice: Subject to any disclaimer, the term of this patent is extended or adjusted under 35 U.S.C. 154(b) by 19 days.

(21) Appl. No.: 09/650,297

(22) Filed: Aug. 29, 2000

(30) Foreign Application Priority Data

Feb. 24, 2002 (TW) ...................................... 089202992 U

(51) Int. Cl.[7] ................................................. H05K 7/04
(52) U.S. Cl. ...................... 361/683; 361/687; 361/725; 361/726; 312/223.1; 364/708.1
(58) Field of Search ................................. 361/683–687, 361/724–727, 816, 818, 753–755, 796; 174/35 R, 35 GC; 364/708.1; 312/223.1, 223.2, 244, 298, 215, 219, 311; 29/11, 434; 16/254, 259, 378, 267; 220/4.02, 254, 255; 411/182, 549, 553

(56) References Cited

U.S. PATENT DOCUMENTS

| 5,561,893 | A | * | 10/1996 | Lee .............................. 29/434 |
| 5,701,231 | A | * | 12/1997 | Do et al. ..................... 361/683 |
| 5,774,330 | A | * | 6/1998 | Melton et al. .............. 361/683 |
| 5,774,337 | A | * | 6/1998 | Lee et al. .................... 361/725 |
| 5,784,251 | A | * | 7/1998 | Miller et al. ................ 361/683 |

* cited by examiner

Primary Examiner—Darren Schuberg
Assistant Examiner—Michael Datskovsky
(74) Attorney, Agent, or Firm—Knobbe, Martens, Olson & Bear, LLP

(57) ABSTRACT

A supporting module for a component set to mount on and for forming a foldable combination when the supporting module is coupled to a lower cover of a housing. The supporting module includes a securing frame and a pivoting member. The securing frame has two opposite faces. One of the two opposite faces is for the component set to mount on, and the other corresponds to another component set that is disposed on the lower cover of the housing. The pivoting member, located on the bottom of the securing frame, is for coupling the securing frame to the lower cover of the housing.

23 Claims, 6 Drawing Sheets

SUPPORTING MODULE FOR FORMING A FOLDABLE SUPPORTING STRUCTURE INSIDE A COMPUTER HOUSING

REFERENCE TO RELATED APPLICATION

This application incorporates by reference Taiwanese application Serial No. 089202992, filed Feb. 24, 2000.

BACKGROUND OF THE INVENTION

1. Field of the Invention

The invention relates to a supporting module, and more specifically to a supporting module for mounting devices or combinations thereof, such as floppy disk drives (FDDs), hard disk drives (HDDs), or compact-disc read only memory (CD-ROM) drives etc., in an apparatus to be combined with the lower part of apparatus housing, forming a foldable supporting mechanism.

2. Description of the Related Art

The trend and technology of personal computers (PCs) tend to lighter, thinner, shorter, and more compact designs resulting in a reduction of space for mounting internal components. Large-sized devices, such as FDDs, HDDs, or CD-ROM drives, have to be mounted in the space above the main board (or motherboard) of the computer. This makes the assembly and disassembly of the main board components cumbersome.

For a general desktop PC, its internal storage devices such as FDD, HDD, and CD-ROM drive, are all conventionally mounted above the main board and there are several frames available for mounting these devices.

(1) Removable frame. The storage devices are first mounted on the frame and the whole frame then slides into the corresponding part of the housing of the PC. Finally, the frame is screwed onto the lower cover of the housing.

(2) Fixed frame. The frame is fixed and combined into the lower cover of the housing during manufacturing. When assembling the main board components, the user is required to follow a certain sequence. Otherwise, the user will have difficulties in assembling the main board due to the arrangement of the devices mounted on the frame.

(3) Removable frame. This is a removable frame similar to the one described in (1) except that the whole frame is fixed from top to bottom onto the lower cover of the housing.

As mentioned above, during assembling components of the main board for maintenance and upgrading purposes, the conventional supporting mechanism with the fixed frame described in (2) is inconvenient as all the devices are fixed and brings about a hindrance. As for the frames described in (1) and (3), although they are removable, it is still inconvenient that users need to separate the frames from the housing to access the main board.

SUMMARY OF THE INVENTION

It is therefore an object of the invention to provide a supporting module for the devices to mount on, which contributes to the reduction of space of PCs while making the assembly and maintenance of the components and devices of the PCs more convenient.

In accordance with the object of the invention, it provides a supporting module for a first component set to mount on and for forming a foldable combination when the supporting module is coupled to a lower cover of a housing. The supporting module t includes securing frame and a pivoting member. The securing frame has two opposite faces, wherein one of the two opposite faces is for the first component set to mount on, and the other corresponds to a second component set that is disposed on the lower cover of the housing. The pivoting member, located on the bottom of the securing frame, is for coupling the securing frame to the lower cover of the housing.

In accordance with the object of the invention, it provides a supporting module for a first component set to mount on, and for forming a foldable combination when the support module is coupled to a lower cover of a housing, wherein the lower cover of the housing comprises a first opening and a second opening. The supporting module includes a securing frame, a pivoting member and a fixer. The securing frame has two opposite faces, wherein one of the two opposite faces is for the first component set to mount on, and the other corresponds to a second component set that is disposed on the lower cover of the housing. The pivoting member, located on the bottom of the securing frame, is for coupling the first opening. The fixer, being disposed on a side of the securing frame, is for engaging the second opening so that the securing frame is fixed on the lower cover of the housing.

In accordance with the object of the invention, it provides a computer housing including a lower cover, a supporting module, and an upper cover. The supporting module, including a securing frame and a pivoting member, is for a component'set to mount on, and for forming a foldable combination when the support module is coupled to the lower cover. The pivoting member, located on the bottom of the securing frame, is for the coupling of the securing frame and the lower cover. The upper cover is for covering the foldable combination of the supporting module and the lower cover.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1A:
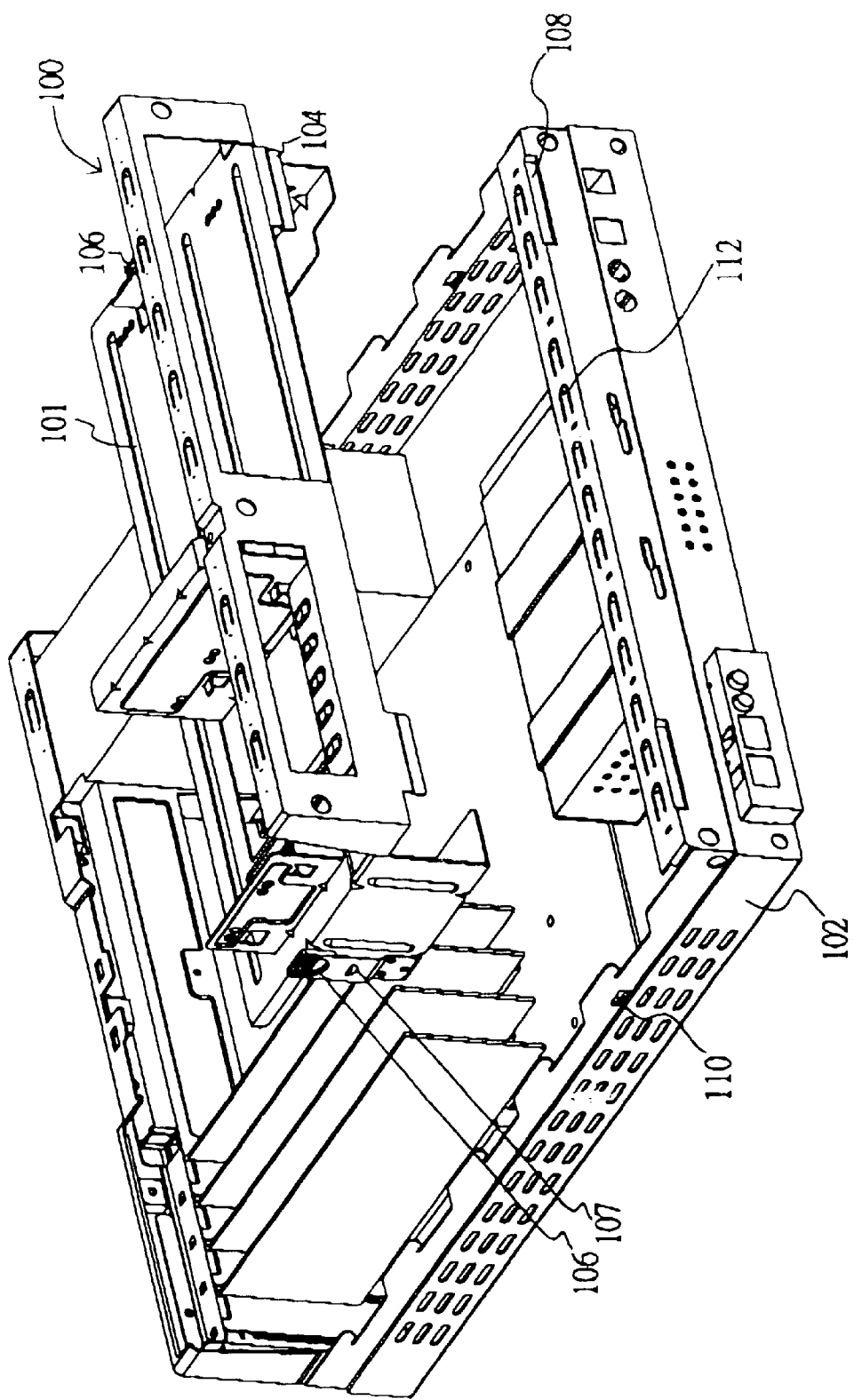
FIGS. 1A and 1B illustrate the front and back view respectively of the supporting module in accordance with a preferred embodiment of the invention.
Figure 1B:
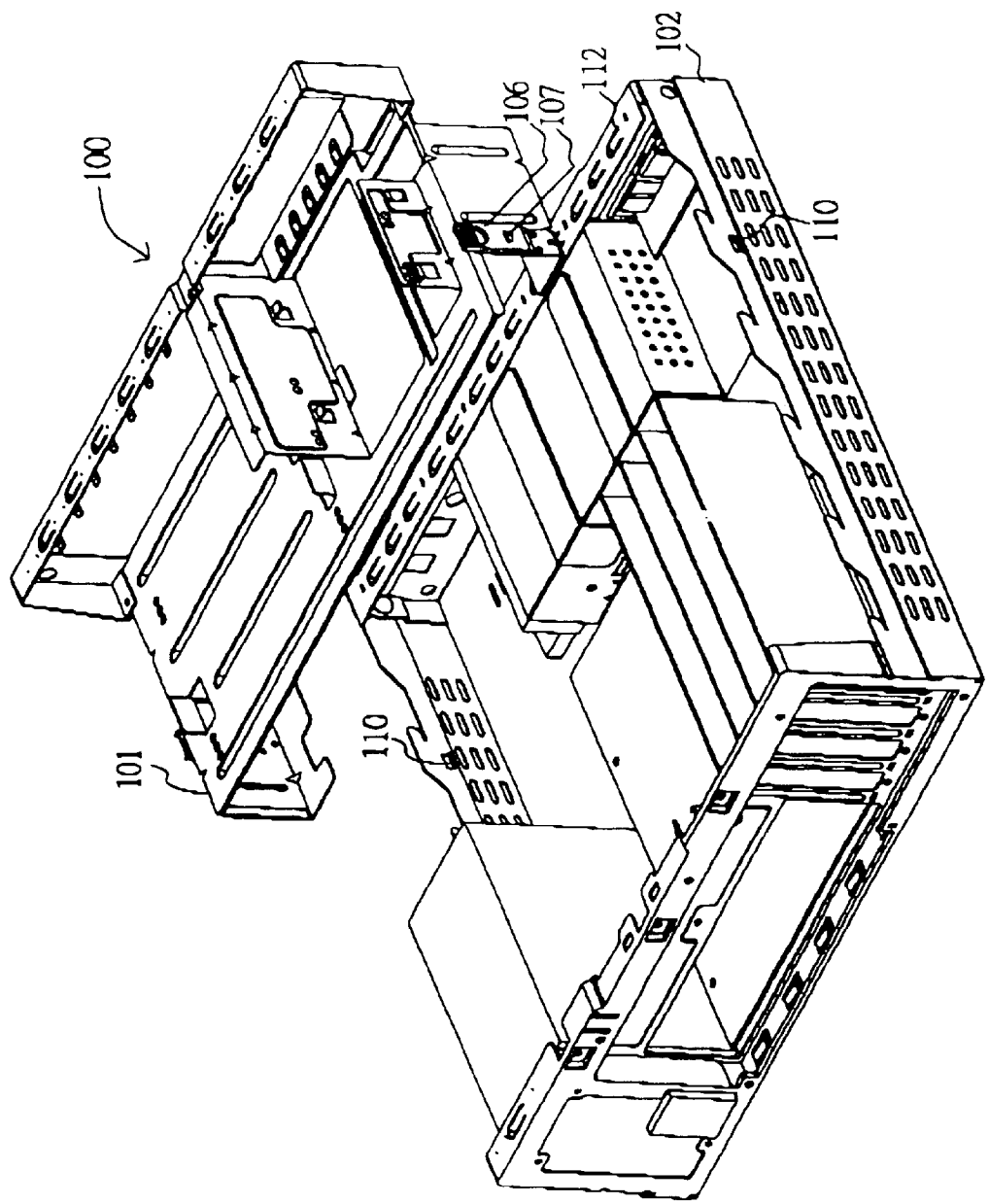

Referring to FIGS. 1A and 1B, they illustrate the supporting module 100 according to the preferred embodiment of the invention, which is accommodated above the lower cover 102 of the housing. The supporting module 100 includes securing frame 101, pivoting member 104, and fixer 106, which is a combination of the parts being made of metal or plastic. In this embodiment, the securing frame 101 contains two opposite faces, in which the upper face is for mounting a set of devices, for example a 3.5" FDD and a 5.25" CD-ROM drive while the lower face corresponds to (or contacts with) another set of devices, such as a HDD. As such, the set of devices corresponding to the lower face of securing frame 101 can be used to support securing frame 101. It should be noted that the supporting module 100 can be implemented to be used for mounting different combinations of devices, for example a 3.5" FDD and a 5.25" FDD, or a 3.5" FDD or a removable HDD etc.

Pivoting member 104, which is on the bottom of securing frame 101, is engaged with the pivoting opening 108, resulting in a foldable combination of securing frame 101 and lower cover 102. The structure of the foldable combination is formed by coupling the pivoting opening 108 to the pivoting member 104 which is an integral part of securing frame 101 and is combined with securing frame 101. It is apparent that various approaches can be utilized to implement the mechanism. For instance, providing the feature of folding, a fixed joining member is applied to couple the securing frame 101 with the lower cover 102. However, in this approach, securing frame 101 and lower cover 102 are in separable while it provides the foldable feature of the resulting combination of them.

The fixer 106 is disposed on securing frame 101 for fixing securing frame 101 on the lower cover 102 when the fixer 106 is engaged with a fixer hole 110. For the position corresponding to the fixer hole 110 on the fixer 106, there is a flange 107 for engaging the fixer hole 110. It is noted that the fixer 106 and the fixer hole 110 can be selectively adopted. If they are not employed, covering the securing frame with the upper cover of the housing (not shown in the Figures) and fastening them can also fix the securing frame.

Figure 2A:
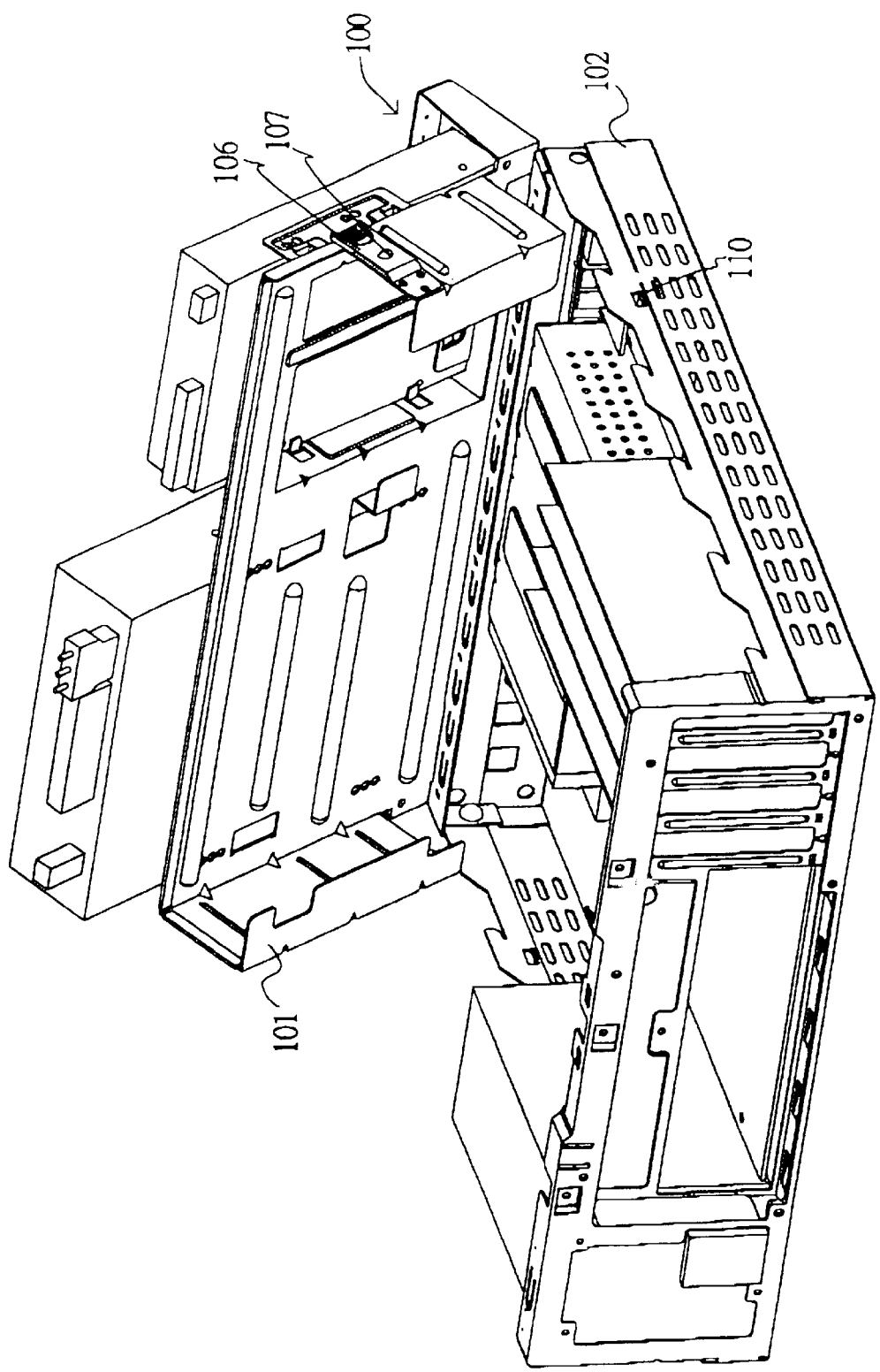
FIGS. 2A and 2B are the back and front view respectively of the combination of the supporting module and the lower cover, which is unfolded such that an arbitrary angle is made between the two combination parts in accordance with the preferred embodiment of the invention.
Figure 2B:
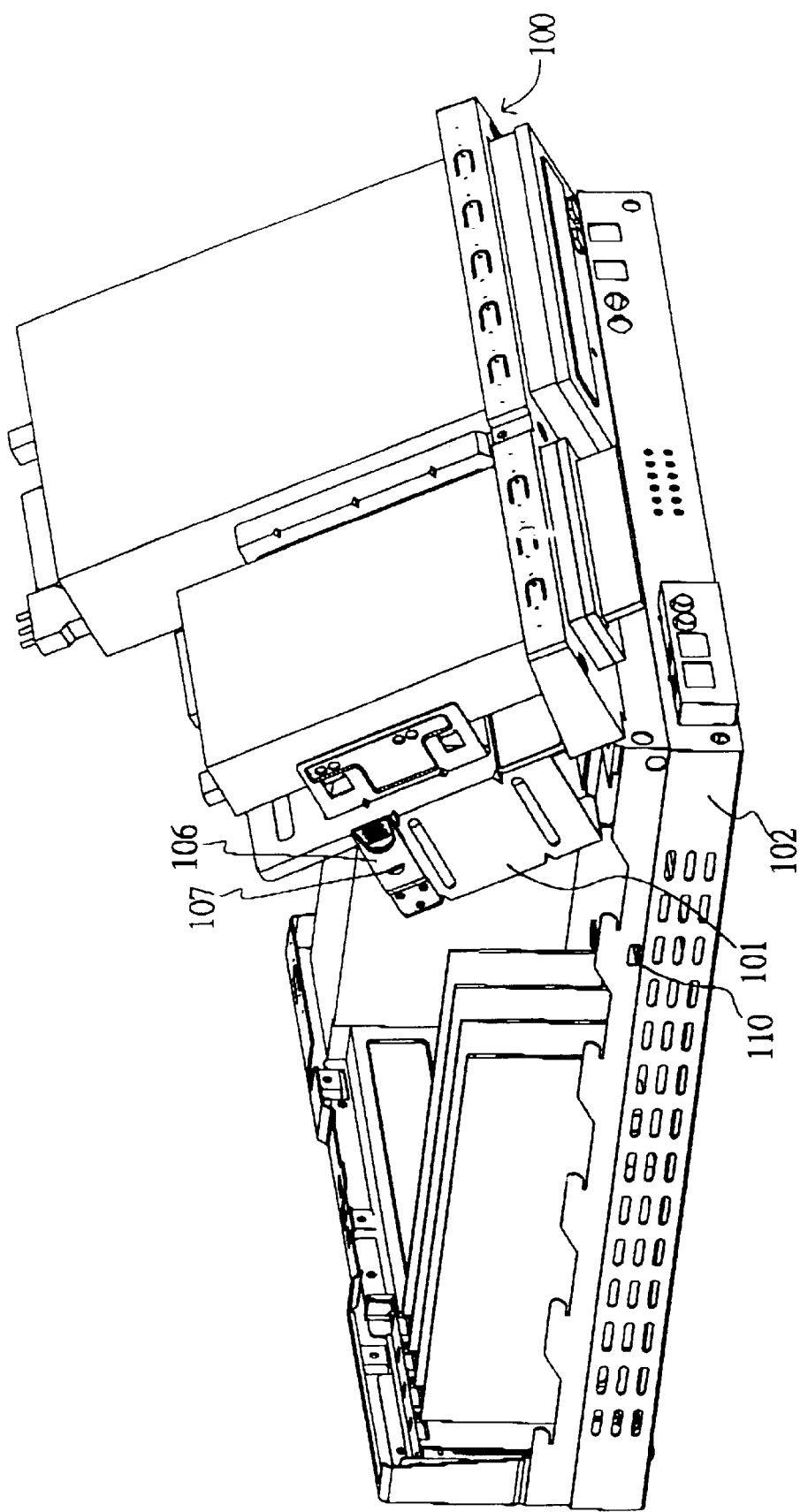
Figure 3:
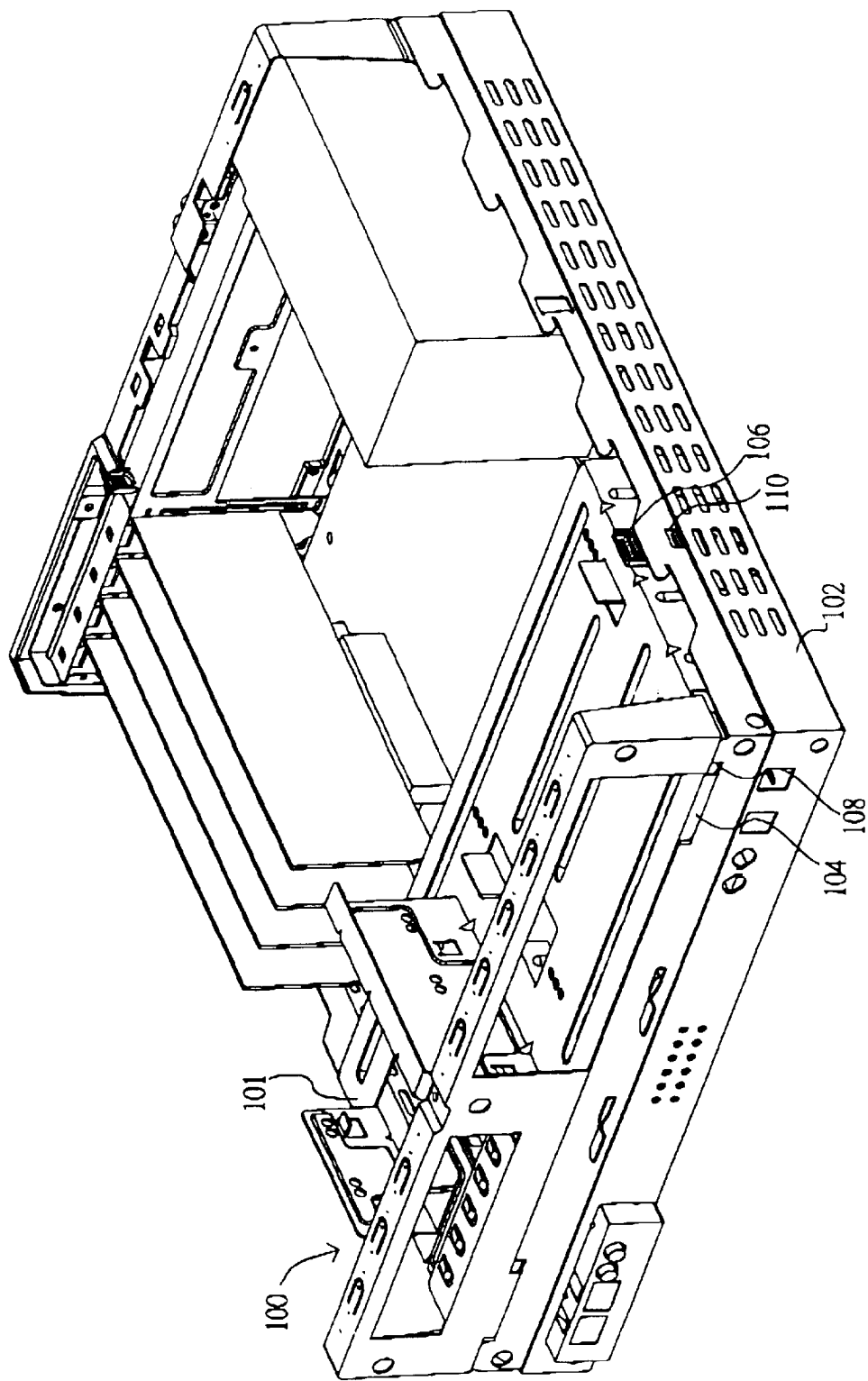
FIG. 3 illustrates the combination of the supporting module and the lower cover, which is folded completely in accordance with the preferred embodiment of the invention.
Figure 4:
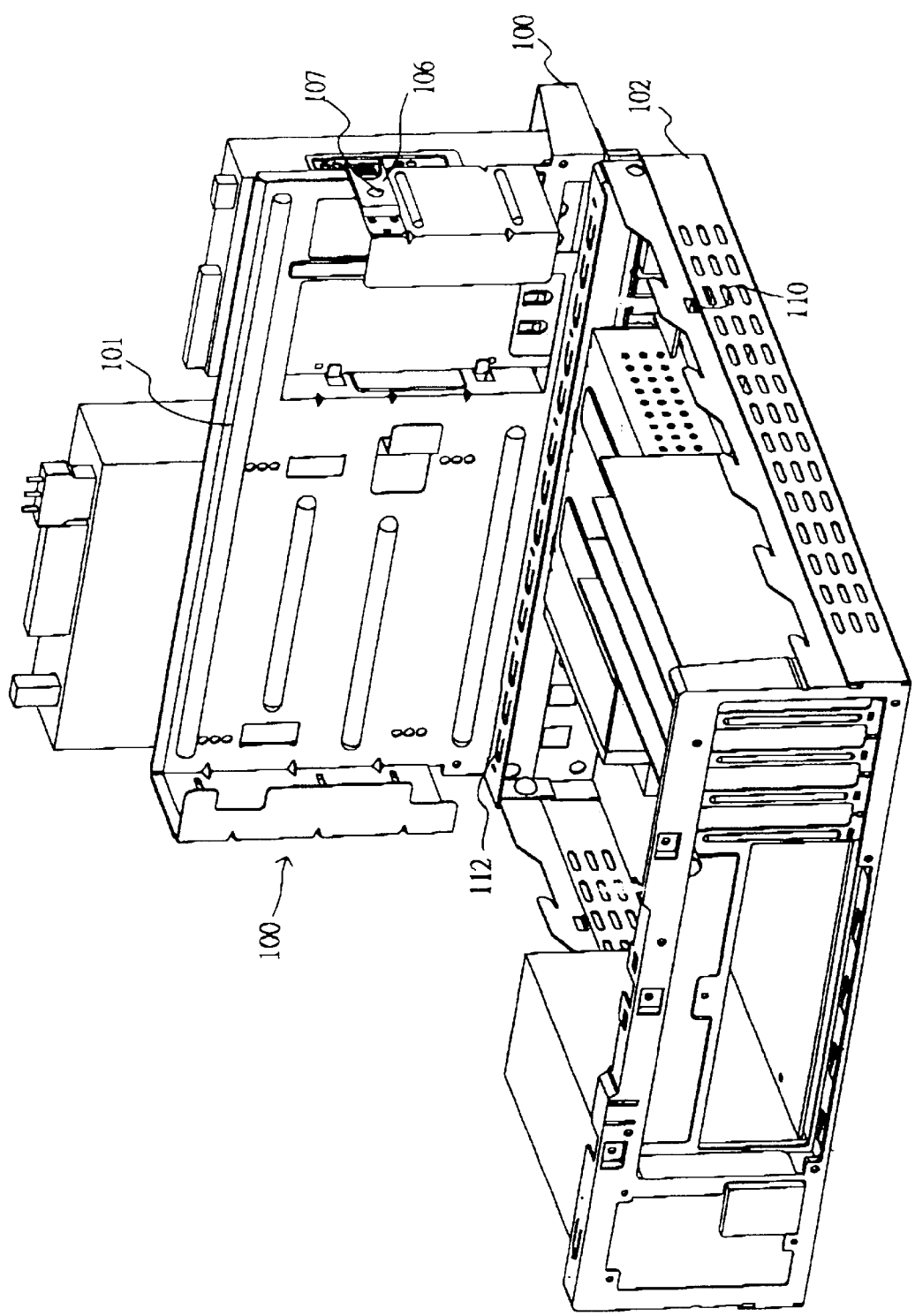
FIG. 4 illustrates the combination of the supporting module and the lower cover, which is unfolded such that a right angle is made between the two combination parts in accordance with the preferred embodiment of the invention.

For the folding of the combination of securing frame 101 and lower cover 102, the pivoting member 104 is first inserted into the pivoting opening 108 in such a way that securing frame 101 makes an angle of about 45 degrees with lower cover 102, as shown in FIGS. 2A and 2B. Securing frame 101 can then fold onto lower cover 102. according to the pivot thus formed. Finally, as shown in FIG. 3, inserting the fixer 106 into the fixer hole 110 completes the closing of securing frame 101 onto lower cover 102. Conversely, if it is required to unfold securing frame 101 from lower cover 102, press the fixers on the opposite sides of securing frame 101 inward at the same time and pull up securing frame 101. As for the assembly and maintenance of the components and devices inside the housing, there are two ways of operation with securing frame 101. One way is only to unfold securing frame 101 from lower cover 102 and leave them connected. Allowing securing frame 101 to make an angle of about 90 degrees with lower cover 102 and holding securing frame 101, as shown in FIG. 4, will provide enough space for the user to do assembly or maintenance work on the main board without being impeded by the arrangements of the FDD and HDD.

The other way is to unfold the securing frame 101 from lower cover 102 and then separating them. Their separation can be made when the combination of securing frame 101 and lower cover 102 is unfolded to an angle of about 45 degrees with the lower cover 102. After separation, the user can do assembly or maintenance work.

In addition, the issue of electromagnetic interference (EMI) in the joints between securing frame 101 and lower cover 102 is also considered in the invention. To decrease the EMI effect, the area which is adjacent to the edge of lower cover 102 where supporting module is joined is disposed a structure for preventing EMI, such as an EMI preventing member 112 as shown in FIG. 4.

On the other hand, when the combination of securing frame 101 and lower cover 102 is folded, covering the folded combination with an upper cover results in a complete computer housing. Moreover, the components or devices that are mounted on supporting module 100 are not only restricted to 3.5" FDDs and 5.25" HDDs. The supporting module can be utilized for mounting any other components or devices, or combinations thereof.

To sum up, the supporting module according to the preferred embodiment of the invention has the following advantages.

(1) Effectively shortening the time of assembly. Since the support module is an independent entity, a secondary assembly operation can be applied to the production line to manufacture it. The completed support modules can then be combined with the lower cover of the housing at a later stage of the assembly process. As such, the time of assembly is effectively shortened, accomplishing the goal of synchronous manufacturing process.

(2) Making assembly and maintenance of other components convenient. The supporting module in the embodiment of the invention is user-friendly and can easily be unfolded from the lower cover to make a free space for performing assembly and maintenance of other components on a main board of the computer system, such as replacing the processor from the main board.

(3) Having the integral structure without separate parts. The pivoting member and the pivoting opening together provide the foldable feature of the combination of the supporting module and the lower cover, resulting in a low-cost implementation. If cost reduction is less of a concern, utilizing an additional pivot mechanism can also provide this feature.

(4) Providing a solution to the problem of difficult assembly and maintenance of components due to a compact housing. In the disclosed embodiment above, after unfolding the combination of the supporting module and lower cover, there is ample room for performing assembly and maintenance easily.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A supporting module, for components to mount on, and for forming a foldable combination on condition that the supporting module is coupled to a lower cover of a housing, the supporting module comprising:

a securing frame having two opposite sides about a horizontal axis, wherein a first component set is mounted within one of the sides, and a second component set being disposed on the lower cover of the housing is mounted within the other frame; and a pivoting member, located on the bottom side of the securing frame, for coupling the securing frame to the lower cover of the housing.

2. The supporting module according to claim 1, wherein the lower cover of the housing comprises a pivoting opening, which is for the pivoting member to engage.

3. The supporting module according to claim 1, further comprising a fixer disposed on a side of the securing frame, for engaging with the lower cover of the housing so that the securing frame is fixed on the lower cover of the housing.

4. The supporting module according to claim 3, wherein the lower cover of the housing further comprises a fixer hole, which is for the fixer to engage with, for fixing the securing frame on the lower cover.

5. The supporting module according to claim 4, wherein the fixer further comprises a flange, which is located at the position corresponding to the fixer hole, for engaging with the fixer hole.

6. The supporting module according to claim 1, further comprising a first fixer and a second fixer, located on two sides of the securing frame respectively.

7. The supporting module according to claim 6, wherein the lower cover of the housing further comprises a first fixer hole and a second fixer hole for the first fixer and the second fixer to engage with respectively.

8. The supporting module according to claim 1, wherein the lower cover of the housing further comprises a plurality of electromagnetic interference preventing members, which are disposed on the area adjacent to the joints between the lower cover of the housing and the securing frame.

9. The supporting module according to claim 1, wherein the first component set comprises a floppy disk drive (FDD) and a compact disk read-only memory (CD-ROM) drive.

10. The supporting module according to claim 1, wherein the securing frame and the pivoting member form an integral whole.

11. The supporting module according to claim 1, wherein the second component set comprises a hard disk drive (HDD).

12. A supporting module, for component sets to mount on, and for forming a foldable combination on condition that the supporting module is coupled to a lower cover of a housing, wherein the lower cover of the housing comprises a first opening and a second opening, the supporting module comprising:

a securing frame having two opposite faces about a horizontal axis, wherein one of the two opposite faces is for a first component set to mount on, and the other corresponds to a second component set that is disposed on the lower cover of the housing;

a pivoting member located on the bottom of the securing frame for coupling the first opening; and a fixer, being disposed on a side of the securing frame, for engaging the second opening so that the securing frame is fixed on the lower cover of the housing.

13. A computer housing, comprising:

a lower cover;

a supporting module, for component sets to mount on, and for forming a foldable combination on condition that the support module is coupled to the lower cover; and an upper cover, for covering the foldable combination with;

wherein the supporting module comprises:

a securing frame having two opposite frames about a horizontal axis for receiving different component sets; and a pivoting member, located on the bottom of the securing frame, for the coupling of the securing frame and the lower cover.

14. The computer housing according to claim 13, wherein the lower cover comprises a pivoting opening, which corresponds to and is for the pivoting member to engage.

15. The computer housing according to claim 13, further comprising a fixer, disposed on a side of the securing frame, for engaging with the lower cover so that the securing frame is fixed on the lower cover.

16. The computer housing according to claim 15, wherein the lower cover further comprises a fixer hole, which is for the fixer to engage with, for fixing the securing frame on the lower cover.

17. The computer housing according to claim 16, wherein the fixer further comprises a flange, which is located at the position corresponding to the fixer hole, for engaging with the fixer hole.

18. The computer housing according to claim 13, further comprising a first fixer and a second fixer, located on two sides of the securing frame, for engaging with the lower cover so that the securing frame is fixed on the lower cover.

19. The computer housing according to claim 18, wherein the lower cover further comprises a first fixer hole and a second fixer hole, which are for the first fixer and the second fixer to engage with respectively and for fixing the securing frame on the lower cover.

20. The computer housing according to claim 13, wherein the lower cover further comprises a plurality of electromagnetic interference preventing members, which are disposed on the area adjacent to the joints between the lower cover and the securing frame.

21. The computer housing according to claim 13, wherein the securing frame has two opposite faces, wherein one of the two opposite faces is for a first component set to mount on and the other corresponds to a second component set that is disposed on the lower cover of the housing, and the first component set is the component set.

22. The computer housing according to claim 21 wherein the first component set comprises a floppy disk drive (FDD) and a compact disk read-only memory (CD-ROM) drive.

23. The computer housing according to claim 21 wherein the second component set comprises a hard disk drive (HDD).

* * * * *